United States Patent
Marupaduga et al.

(10) Patent No.: US 9,462,518 B1
(45) Date of Patent: Oct. 4, 2016

(54) OPTIMIZATION OF NEIGHBOR INFORMATION TRANSFER IN A LONG TERM EVOLUTION NETWORK

(71) Applicant: Sprint Communications Company L.P., Overland Park, KS (US)

(72) Inventors: Sreekar Marupaduga, Overland Park, KS (US); Nicholas David Kullman, Vashon, WA (US); Andrew Mark Wurtenberger, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 226 days.

(21) Appl. No.: 14/016,428

(22) Filed: Sep. 3, 2013

(51) Int. Cl.
*H04W 48/16* (2009.01)
*H04W 36/00* (2009.01)

(52) U.S. Cl.
CPC .................. *H04W 36/0083* (2013.01)

(58) Field of Classification Search
CPC ........... H04W 48/16; H04W 36/0083; H04W 64/00; H04L 29/08657; G01S 5/0252; G01S 5/02
USPC ......... 455/434, 414, 436, 438, 437.4, 435.1, 455/435.2, 561, 450, 443, 444
See application file for complete search history.

(56) References Cited

U.S. PATENT DOCUMENTS

| | | | | |
|---|---|---|---|---|
| 8,041,353 B2* | 10/2011 | Kazmi | ................. | H04J 11/0093 455/434 |
| 2010/0210301 A1* | 8/2010 | Dietz | ................. | H04M 1/72577 455/556.1 |
| 2012/0257568 A1 | 10/2012 | Cai et al. | | |
| 2013/0023302 A1* | 1/2013 | Sivanesan | ............ | H04W 36/32 455/525 |
| 2013/0137434 A1* | 5/2013 | Godin | ........................... | 455/436 |

* cited by examiner

*Primary Examiner* — Kamran Afshar
*Assistant Examiner* — Farid Seyedvosoghi (57) ABSTRACT

Embodiments disclosed herein provide systems and methods for optimizing the transfer of neighbor information in a Long Term Evolution (LTE) network. In a particular embodiment, a method provides exchanging communications with an eNodeB of a LTE wireless communication network. The method further provides receiving at least one physical cell identifier (PCI) from at least one respective neighboring cell during a predetermined time period. After the predetermined time period, the method provides transferring the at least one PCI to the eNodeB.

20 Claims, 6 Drawing Sheets

OPTIMIZATION OF NEIGHBOR INFORMATION TRANSFER IN A LONG TERM EVOLUTION NETWORK

TECHNICAL BACKGROUND

Long Term Evolution wireless communication networks rely on wireless devices to identify neighboring wireless cells. After receiving information identifying one or more neighboring cells from a wireless device, an eNodeB for the LTE network is aware of cells to which communications with the wireless device may handoff. Thus, upon the eNodeB determining that a handover is necessary, the eNodeB can perform functions to handoff communications to one of the identified cells.

Typically, to report neighboring cells to an eNodeB, a wireless device monitors for wireless cell identifiers transferred in reference signals transmitted from neighboring cells. Upon receiving an identifier, the wireless device transfers the identifier in a message to the eNodeB. Then upon receiving a subsequent identifier, the wireless device transfers the subsequent identifier in another message to the eNodeB. Thus, multiple messages and multiple instances of uplink resources are used to transfer the multiple wireless cell identifiers to the eNodeB.

OVERVIEW

Embodiments disclosed herein provide systems and methods for optimizing the transfer of neighbor information in a Long Term Evolution (LTE) network. In a particular embodiment, a method provides exchanging communications with an eNodeB of a LTE wireless communication network. The method further provides receiving at least one physical cell identifier (PCI) from at least one respective neighboring cell during a predetermined time period. After the predetermined time period, the method provides transferring the at least one PCI to the eNodeB.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
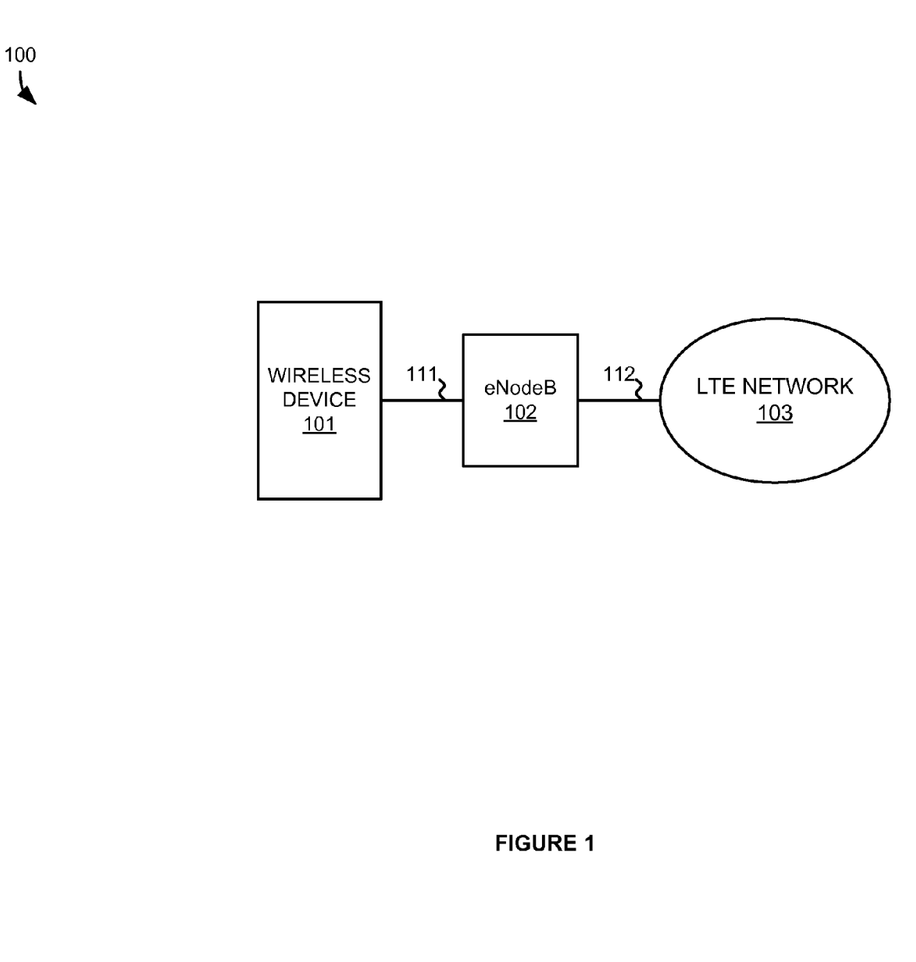
FIG. 1 illustrates a wireless communication system for optimizing the transfer of neighbor information.

FIG. 1 illustrates wireless communication system 100. Wireless communication system 100 includes wireless communication device 101, eNodeB 102, and Long Term Evolution (LTE) communication network 103. Wireless communication device 101 and eNodeB 102 communicate over wireless link 111. eNodeB 102 and LTE communication network 103 communicate over communication link 112. It should be understood that, while the present disclosure refers to an LTE access node as an eNodeB, the disclosure also applies to other types of access nodes that may exist for an LTE network.

In operation, LTE network 103 provides communication services to wireless devices, such as wireless device 101, through eNodeBs including eNodeB 102. The nature of wireless device 101 being mobile allows wireless device 101 to move to areas that are outside the coverage area of a single wireless cell of eNodeB 102. As wireless device 101 is leaving the coverage area of that wireless cell, communications exchanged between wireless device 101 and the wireless cell of eNodeB 102 handoff to another wireless cell of LTE network 103. The other wireless cell may be another cell of eNodeB 102 or may be a cell of another eNodeB of LTE network 103.

To help accomplish the handoff, wireless device 102 informs eNodeB 102 about neighboring LTE cells. Specifically, eNodeB 102 monitors for LTE reference signals that include cell identifiers for neighboring wireless cells. In LTE, the cell identifiers are commonly called Physical Cell Identifiers (PCIs). Accordingly, each cell of an eNodeB on LTE network 103 transmits a reference signal having a PCI to identify itself. Wireless device 101 will report any PCIs that it receives to eNodeB 102. eNodeB 102 is thereby informed of the identities of any neighboring cells to which communications with wireless device 101 may be handed off.

Reporting each PCI to the eNodeB as each individual PCI is identified causes wireless device 101 to initiate and use uplink resources each time a new PCI is identified. Moreover, a limited number of PCIs exist and eNodeB 102 may therefore require a global cell identifier in order to request a network address corresponding to an identified cell for which eNodeB 102 does not already have a network address. Under those circumstances, more wireless resources will be used for eNodeB 102 to request a global cell identifier for the identified cell from wireless device 101 and for eNodeB 102 to receive a global cell identifier for the identified cell from wireless device 101.

Figure 2:
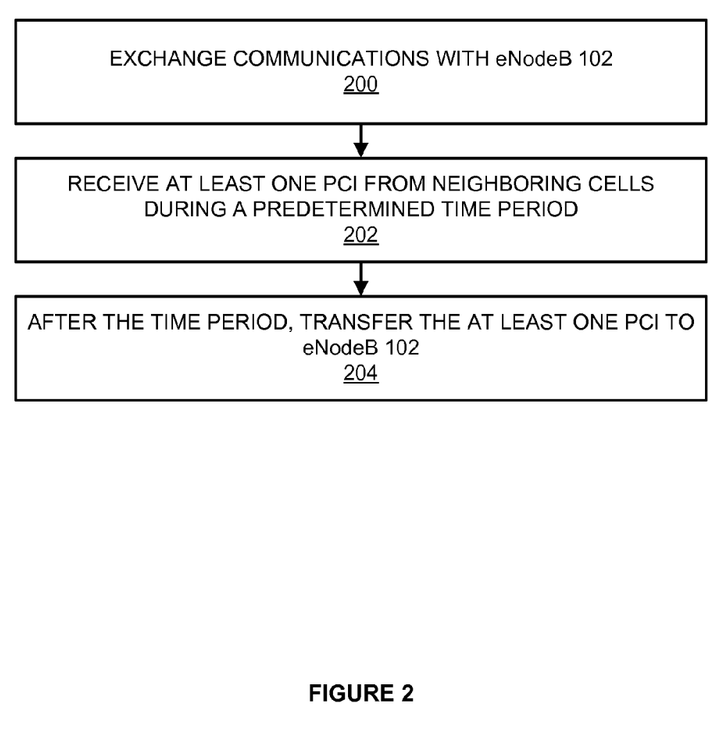
FIG. 2 illustrates an operation of the wireless communication system for optimizing the transfer of neighbor information.

FIG. 2 illustrates an operation of wireless communication system 100 to optimize the transfer of neighbor information. Wireless device 101 exchanges communications with eNodeB 102 of LTE network 103 (step 200). The exchanged communications may be traffic channel communications, control communications, or any other type of communications that may be exchanged with an eNodeB—including combinations thereof.

Wireless device 101 receives at least one PCI from at least one respective neighboring cell during a predetermined time period (step 202). The at least one PCI may be received by wireless device 101 from wireless cells of eNodeB 302 other than the wireless cell through which wireless device 101 is currently exchanging communications or from wireless cells of other eNodeBs on LTE network 103. The predetermined time period may be any amount of time and may be set by an operator of LTE network 103. Preferably, the time period is an amount of time that is great enough for wireless device 101 to potentially receive more than one PCI while not long enough to disrupt any handoff that may need to occur in order for wireless device 101 to continue a communication session. Accordingly, the predetermined time period is likely, but not necessarily, on the order of a couple seconds.

After the predetermined time period, wireless device 101 transfers the at least one PCI to eNodeB 102 (step 204). The at least one PCI may be transferred to eNodeB 102 in control or traffic channel communications. For example, the PCIs may be transferred in a radio resource control (RRC) message on an uplink control channel or in some other type of message. Advantageously, the predetermined time period allows for wireless device 101 to use uplink wireless resources of eNodeB 102 to transfer more than one PCI at a time rather than using the uplink resources separately for each individual PCI. Once eNodeB 102 is notified of wireless cell(s) neighboring wireless device 101 based on the at least one PCI, eNodeB 102 is able to select one of those cells to which communications with wireless device 101 should hand off.

In some situations, eNodeB 102 may not know a network address corresponding to a wireless cell identified by a PCI that eNodeB 102 receives from wireless device 102. In those situations, eNodeB 102 uses a global identifier corresponding to the wireless cell to query a system on LTE network 103 for the network address. The global identifier, commonly called a cell global identifier (CGI), is used for the query because, while a particular PCI may be unique to cells of eNodeBs within signal range of a single wireless device, that PCI may still be used for cells of other eNodeBs on LTE network 103. Accordingly, eNodeB uses the global identifier, which is unique to a particular cell, to obtain the network address.

To further optimize the use of wireless resources with eNodeB 102, rather than transferring the global identifier(s) corresponding to the at least one PCI individually, wireless device 101 may transfer the global identifiers along with the at least one PCI at step 204. While eNodeB 102 may not require all global identifiers (i.e. eNodeB 102 may not need to obtain network addresses for all of the at least one PCIs), transferring the global identifiers with the at least one PCI allows wireless device 101 to not use additional uplink resources to transfer the global identifiers separately. Moreover, any downlink resources that eNodeB 102 may have used to request particular global identifiers would also not be needed.

In some embodiments, wireless device 101 is configured to use the method of FIG. 2 when wireless device 101 is has low mobility (i.e. not moving around much if at all) and good wireless signal conditions with eNodeB 102. Otherwise, wireless device 101 transfers any received PCIs and global identifiers individually. The mobility level of wireless device 101 may be determined based on a speed of wireless device 301, Global Positioning System (GPS) coordinate movement, or some other means for determining mobility of a wireless device—including combinations thereof. For example, if wireless device 101 determines that its speed is below a threshold speed, then wireless device 101 determines that it currently has low mobility. Similarly, if wireless device 101 determines that wireless signal conditions are above a threshold, then wireless device 101 has good wireless signal conditions. Wireless signal conditions may be measured as a power level of the wireless signal received from eNodeB 102, a data error rate for data communications exchanged with eNodeB 102, or any other means for measuring wireless signal conditions—including combinations thereof.

Wireless device 101 may not want to use the method of FIG. 2 in high mobility and/or poor wireless signal conditions because, in those circumstances, wireless device 101 may need to handoff communications to a new wireless cell more quickly than would be allowed if wireless device 101 waited the predetermined period of time to transfer the PCIs of any candidate handoff cells. For example, if wireless device 101 is travelling at a high rate of speed, then wireless device 101 may prefer to transfer a PCI to eNodeB 102 upon receipt of the PCI at wireless device 101. eNodeB 102 can thereby begin determining if the cell identified by that PCI is a good candidate for handoff sooner than if wireless device 101 had waited to transfer the PCI. Similarly, under poor wireless signal conditions wireless device 101 may prefer to expedite the possibility of handing off to another wireless cell rather that may have better conditions than wait the predetermined time period.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

eNodeB 102 comprises RF communication circuitry and an antenna. The RF communication circuitry typically includes an amplifier, filter, RF modulator, and signal processing circuitry. eNodeB 102 may also comprise a router, server, memory device, software, processing circuitry, cabling, power supply, network communication interface, structural support, or some other communication apparatus.

LTE communication network 103 comprises network elements that provide LTE communications services to wireless device 101 through eNodeB 102. LTE communication network 103 may comprise switches, additional eNodeBs, wireless access nodes, Internet routers, network gateways, application servers, computer systems, communication links, or some other type of communication equipment—including combinations thereof.

Wireless link 111 uses the air or space as the transport media. Wireless link 111 uses the LTE wireless protocol or some other wireless protocol based upon the LTE wireless protocol. Communication link 112 uses metal, glass, air, space, or some other material as the transport media. Communication link 112 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 112 could be a direct link or may include intermediate networks, systems, or devices.

Figure 3:
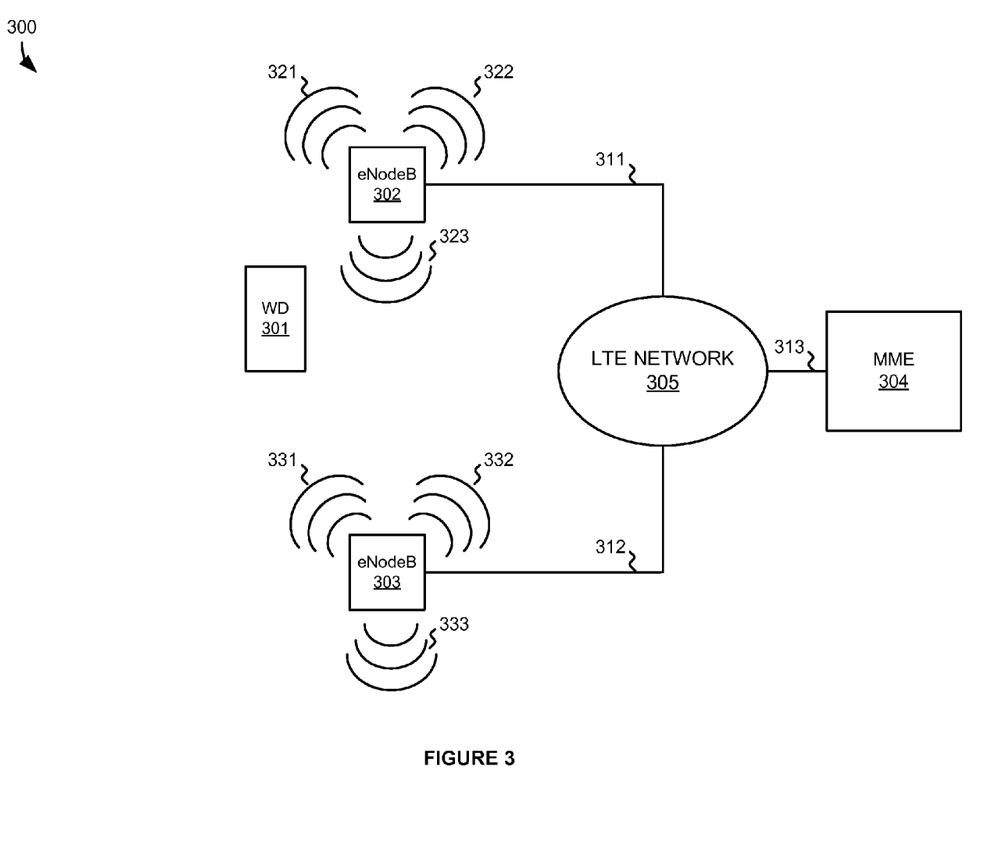
FIG. 3 illustrates a wireless communication system for optimizing the transfer of neighbor information.

FIG. 3 illustrates wireless communication system 300. Wireless communication system 300 includes wireless device 301, eNodeB 302, eNodeB 303, mobility management entity (MME) 304, and LTE communication network 305. eNodeB 302 and LTE communication network 305 communicate over communication link 311. eNodeB 303 and LTE communication network 305 communicate over communication link 312. LTE communication network 305 and MME 304 communicate over communication link 313. While eNodeB 302, eNodeB 303, and MME 304 are shown separately from LTE network 305, the elements are considered part of LTE network 305. Wireless device 301 is capable of exchanging communications with LTE network 305 through wireless links with wireless cells 321-323 of eNodeB 302 and wireless cells 331-333 of eNodeB 303.

As wireless device 301 moves about the area serviced by eNodeBs 302 and 303, wireless device 301 may exchange communications with different ones of the wireless cells. Moreover, if wireless device 301 is exchanging communications for an active communication session through one of the wireless cells, then wireless device 301 may need to handoff to another wireless cell during the communication session. The handoff may be necessitated by wireless device 301 moving away from one wireless cell and into another, communications otherwise degrading with the current wireless cell, or for any other reason that a wireless device may need to handoff. Thus, in order to facilitate a handoff should the need arise, wireless device 301 monitors for and transfers any PCIs that wireless device 301 receives to the eNodeB currently servicing the session.

Figure 4:
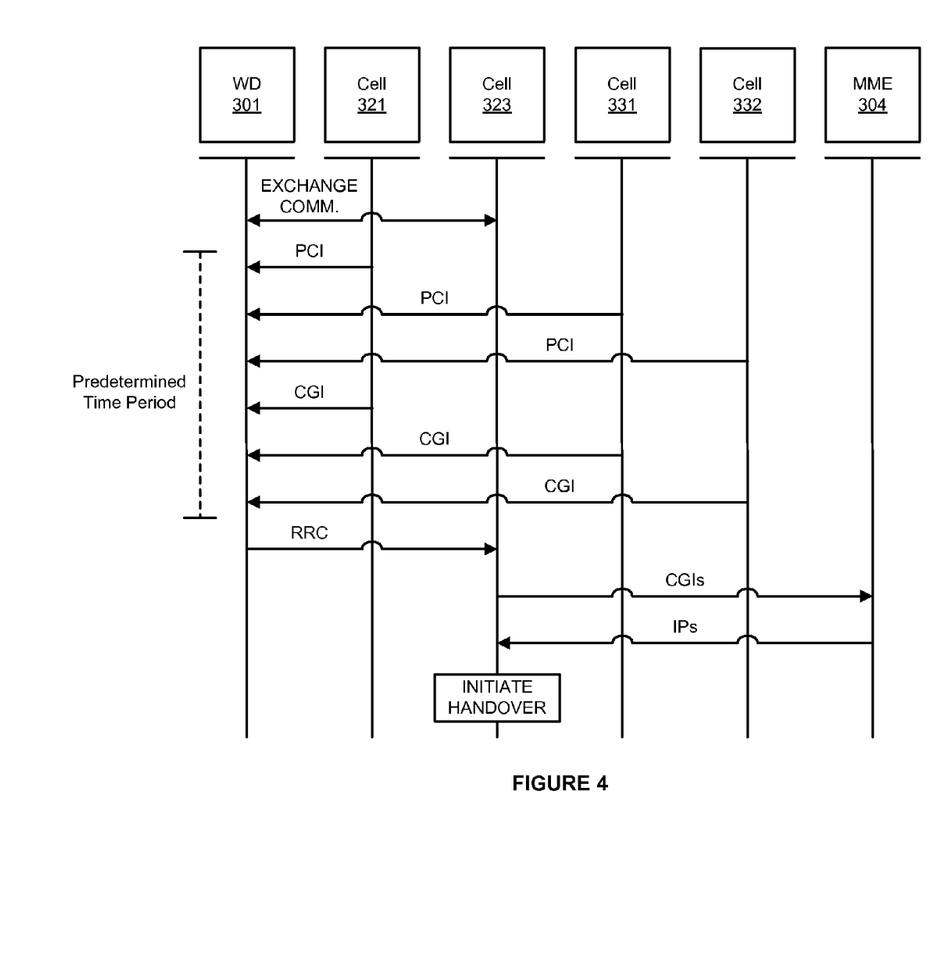
FIG. 4 illustrates an operation of the wireless communication system for optimizing the transfer of neighbor information.

FIG. 4 is a sequence diagram illustrating an operation of wireless communication system 300 to optimize the transfer of neighbor information. In this example, wireless device 301 is exchanging communications for a communication session with eNodeB 302 through wireless sector 323. The communication session may comprise any sort of communications that may be exchanged over an LTE data traffic channel including, but not limited to, voice, video, email, web browsing, or some other type of application data.

During the exchange of data for the communication session, wireless device 301 monitors for and receives PCIs from neighboring wireless cells during a predetermined period of time. The predetermined period of time may be set by an operator of LTE network 105, may be preinstalled into operating software for wireless device 301, or obtained by other means. In this example, wireless device 301 is positioned such that wireless device 301 receives PCIs for wireless cells 321, 331, and 332 before the predetermined period of time elapses. Additionally, after receiving the PCIs, wireless device 301 monitors for and receives cell global identifiers (CGIs) for each respective cell identified by the PCIs. In particular, upon being identified to wireless device 301 by the PCIs, wireless device 301 monitors a broadcast control channel (BCCH) for each of the identified cells to receive each cell's respective CGI. While FIG. 4 illustrates that all the PCIs are received and then all the corresponding CGIs are received, a CGI for a wireless cell may be received at any time after the PCI for the wireless cell is received. Thus, the receipt of PCIs and CGIs may be intermingled.

After the predetermined time period has elapsed, wireless device 301 may reset the time period and monitor for additional PCIs and CGIs in order to maintain a current record of received PCIs and CGIs at eNodeB 302.

Wireless device 301 then transfers the received PCIs and CGIs to eNodeB 302 in a single RRC message. Upon receiving the RRC message, eNodeB 302 determines for which of the PCIs eNodeB 302 needs Internet Protocol (IP) addresses. In this example, eNodeB 302 may already know the IP address for wireless cell 321 since wireless cell 321 is another cell of eNodeB 302 itself. Thus, eNodeB 302 determines that IP addresses are needed for wireless cells 331 and 332, which are cells of neighboring eNodeB 303. The CGI for wireless cell 331 and the CGI for wireless cell 332 are transferred to MME 304 at the same time (e.g. in the same message) in order to further conserve resources between eNodeB 302 and MME 304. In response to receiving the CGIs, MME 304 determines the IP addresses associated with each CGI and transfers the addresses to eNodeB 302.

Once eNodeB 302 receives the IP addresses, eNodeB 302 will be able to initiate a handover procedure to handoff communications for the communication session to one of cells 321, 331, or 332 if eNodeB 302 determines that a handover is necessary. eNodeB 302 may determine to which of the wireless cells wireless device 301 should hand off based on additional information, such as wireless signal strength, that wireless device 301 reports about each cell. In some embodiments, eNodeB 302 may determine to which cell wireless device 301 should handoff before transferring the CGIs to MME 304 so that eNodeB 302 does not request an IP address for a cell to which wireless device 301 is not going to be handing off.

Additionally, in some embodiments, the period of time may elapse before corresponding CGIs are received for at least some of the received PCIs. In those embodiments, wireless device 301 may send the RRC message without the unreceived CGIs. Alternatively, wireless device 301 may wait until the CGIs are received before sending the RRC message.

Figure 5:
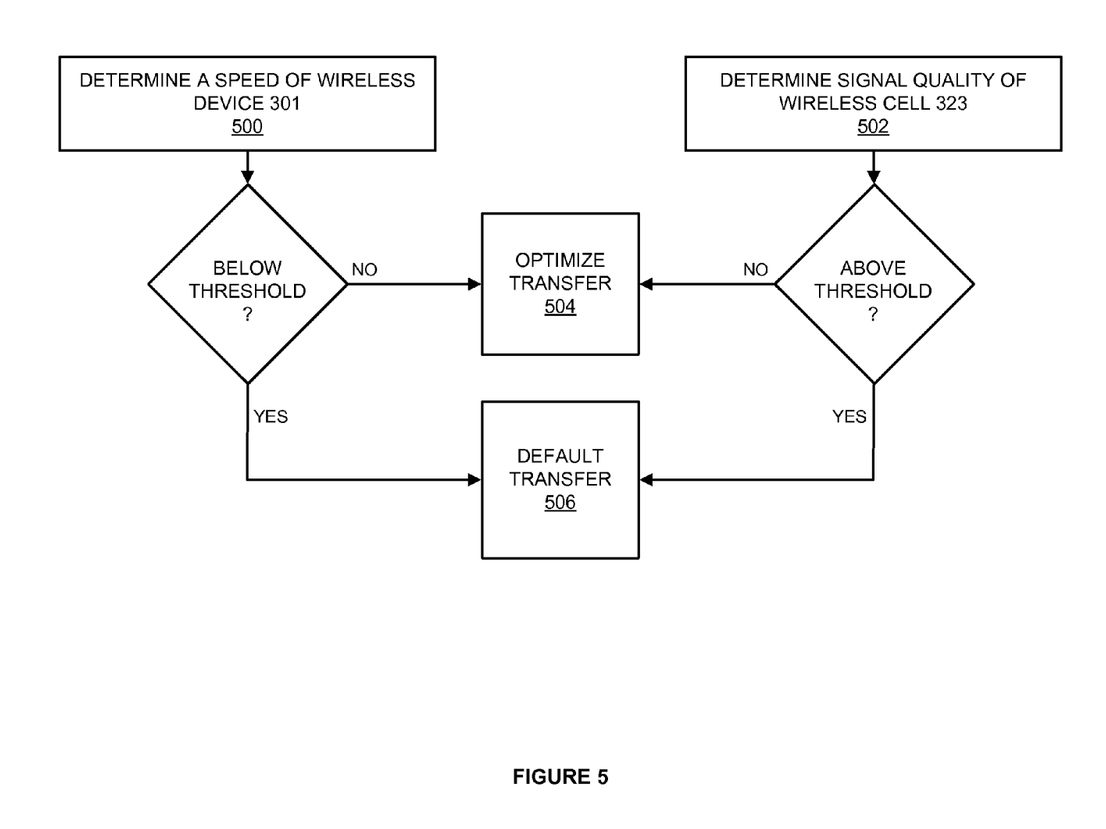
FIG. 5 illustrates an operation of the wireless communication system for determining whether to optimize the transfer of neighbor information.

FIG. 5 illustrates an operation of wireless communication system 300 to determine whether to optimize the transfer of neighbor information. In this example, as before, wireless device 301 is exchanging communications with eNodeB 302 through wireless cell 323. Wireless device 301 determines a speed of wireless device 301 (step 500) and determines a signal quality of communications from wireless cell 323 (step 502). The speed may derived from GPS coordinate information received from a GPS receiver within wireless device 301 or may be based on some other means for determining device speed. The signal quality may be measured as a received signal strength of a signal received from wireless cell 323, a bit error rate for communications with wireless cell 323, or any other measure of signal quality—including combinations thereof.

If the speed of wireless device 301 is below a preset speed threshold or the signal quality is above a preset signal quality threshold, then wireless device 301 uses the optimized PCI and CGI transfer method described herein (step 504). Otherwise, wireless device 301 uses a default transfer method (step 506). The default transfer method may be a method that transfers PCIs and CGIs to eNodeB 302 without waiting for the predetermined time period to elapse. Like the predetermined time period discussed above, the speed threshold and the signal quality threshold may be set by an operator of LTE network 105, may be preinstalled into operating software for wireless device 301, or obtained by other means.

Figure 6:
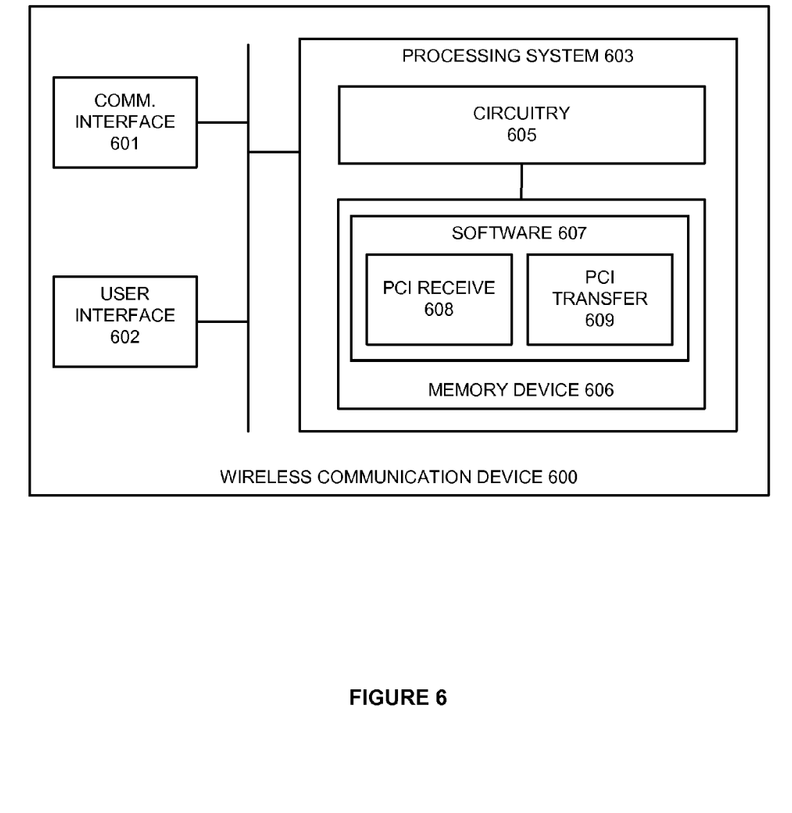
FIG. 6 illustrates a wireless communication device for optimizing the transfer of neighbor information.

FIG. 6 illustrates wireless communication device 600. Wireless communication device 600 is an example of wireless communication device 101, although device 101 could use alternative configurations. Wireless communication device 600 comprises wireless communication interface 601, user interface 602, and processing system 603. Processing system 603 is linked to wireless communication interface 601 and user interface 602. Processing system 603 includes processing circuitry 605 and memory device 606 that stores operating software 607. Wireless communication device 600 may include other well-known components such as a battery and enclosure that are not shown for clarity. Wireless communication device 600 may be a telephone, computer, e-book, mobile Internet appliance, media player, game console, wireless network interface card, or some other wireless communication apparatus—including combinations thereof.

Wireless communication interface 601 comprises RF communication circuitry and an antenna. The RF communication circuitry typically includes an amplifier, filter, RF modulator, and signal processing circuitry. Wireless communication interface 601 may also include a memory device, software, processing circuitry, or some other communication device. Wireless communication interface 601 may use various protocols, such as CDMA, EVDO, WIMAX, GSM, LTE, WIFI, HSPA, or some other wireless communication format.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. User interface 602 may omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus. Processing circuitry 605 is typically mounted on a circuit board that may also hold memory device 606 and portions of communication interface 601 and user interface 602. Operating software 607 comprises computer programs, firmware, or some other form of machine-readable processing instructions. Operating software 607 includes PCI receiving module 608 and PCI transferring module 609. Operating software 607 may further include an operating system, utilities, drivers, network interfaces, applications, or some other type of software. When executed by processing circuitry 605, operating software 607 directs processing system 603 to operate wireless communication device 600 as described herein.

In particular, operating software 607 directs processing system 603 to exchange communications with an eNodeB of an LTE wireless communication network via communication interface 601. PCI receiving module 608 directs processing system 603 to receive, via communication interface 601, at least one physical cell identifier (PCI) from at least one respective neighboring cell during a predetermined time period. After the predetermined time period, PCI transferring module 609 directs processing system 603 to transfer, via communication interface 601, the at least one PCI to the eNodeB.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device, comprising:
exchanging communications with an eNodeB of a Long Term Evolution (LTE) wireless communication network;
receiving at least one physical cell identifier (PCI) from at least one respective neighboring cell during a predetermined time period;
determining a level of mobility for the wireless communication device based on wireless signal conditions with the eNodeB;
if the level of mobility for the wireless communication device is high, then transferring the at least one PCI to the eNodeB after receiving the at least one PCI from the at least one respective neighboring cell; and
if the level of mobility for the wireless communication device is low, then transferring the at least one PCI to the eNodeB after the predetermined time period.

2. The method of claim 1, further comprising:
monitoring control channels for at least one cell global identifier, wherein each cell global identifier of the at least one cell global identifier corresponds to a respective one of the at least one PCI.

3. The method of claim 2, further comprising:
after the predetermined time period, transferring the at least one cell global identifier to the eNodeB.

4. The method of claim 3, wherein the at least one PCI is transferred to the eNodeB along with the at least one global cell identifier.

5. The method of claim 3, wherein the at least one PCI and the at least one cell global identifier are transferred to the eNodeB in a Radio Resource Control (RRC) message.

6. The method of claim 3, wherein the eNodeB queries a mobility management entity (MME) for network addresses corresponding to at least a subset of the at least one PCI.

7. The method of claim 6, wherein the subset of the at least one PCI comprises at least one PCI for which the eNodeB does not have a network address.

8. The method of claim 6, wherein the eNodeB queries the MME for the network addresses as a group.

9. The method of claim 1, further comprising:
after transferring the at least one PCI to the eNodeB, handing off to an LTE cell corresponding to one of the at least one PCI.

10. The method of claim 1, wherein the at least one PCI is received in a respective at least one reference signal transmitted from the at least one neighboring cell.

11. A wireless communication device, comprising:
a wireless communication interface coupled to a data processing system, the wireless communication interface configured to exchange communications with an eNodeB of a Long Term Evolution (LTE) wireless communication network, and receive at least one physical cell identifier (PCI) from at least one respective neighboring cell during a predetermined time period;
the data processing system configured to determine a level of mobility for the wireless communication device based on wireless signal conditions with the eNodeB;
if the level of mobility for the wireless communication device is high, then the wireless communication interface is configured to transfer the at least one PCI to the eNodeB after receiving the at least one PCI from the at least one respective neighboring cell; and
if the level of mobility for the wireless communication device is low, then the wireless communication interface is configured to transfer the at least one PCI to the eNodeB after the predetermined time period.

12. The wireless communication device of claim 11, further comprising:
the wireless communication interface configured to monitor control channels for at least one cell global identifier, wherein each cell global identifier of the at least one cell global identifier corresponds to a respective one of the at least one PCI.

13. The wireless communication device of claim 12, further comprising:

the wireless communication interface configured to, after the predetermined time period, transfer the at least one cell global identifier to the eNodeB.

14. The wireless communication device of claim 13, wherein the at least one PCI is transferred to the eNodeB along with the at least one global cell identifier.

15. The wireless communication device of claim 13, wherein the at least one PCI and the at least one cell global identifier are transferred to the eNodeB in a Radio Resource Control (RRC) message.

16. The wireless communication device of claim 13, wherein the eNodeB queries a mobility management entity (MME) for network addresses corresponding to at least a subset of the at least one PCI.

17. The wireless communication device of claim 16, wherein the subset of the at least one PCI comprises at least one PCI for which the eNodeB does not have a network address.

18. The wireless communication device of claim 16, wherein the eNodeB queries the MME for the network addresses as a group.

19. The wireless communication device of claim 11, further comprising:

the wireless communication interface configured to, after transferring the at least one PCI to the eNodeB, hand off to an LTE cell corresponding to one of the at least one PCI.

20. The wireless communication device of claim 11, wherein the at least one PCI is received in a respective at least one reference signal transmitted from the at least one neighboring cell.

* * * * *